US008476869B2

(12) United States Patent
Shiu et al.

(10) Patent No.: US 8,476,869 B2
(45) Date of Patent: Jul. 2, 2013

(54) BATTERY VOLTAGE EQUALIZER CIRCUIT AND METHOD FOR USING THE SAME

(75) Inventors: Shian-Sung Shiu, Taipei County (TW); Yang Yang, Wuxi (CN); Li-Min Lee, Taipei County (TW)

(73) Assignee: Green Solution Technology Co., Ltd., Taipei County (TW)

( * ) Notice: Subject to any disclaimer, the term of this patent is extended or adjusted under 35 U.S.C. 154(b) by 344 days.

(21) Appl. No.: 12/872,297

(22) Filed: Aug. 31, 2010

(65) Prior Publication Data

US 2011/0062917 A1    Mar. 17, 2011

(30) Foreign Application Priority Data

Sep. 15, 2009   (TW) ................................ 98130981 A

(51) Int. Cl.
*H02J 7/00*    (2006.01)
*H02J 9/06*    (2006.01)

(52) U.S. Cl.
USPC ............. 320/118; 320/124; 320/127; 307/66; 429/320

(58) Field of Classification Search
USPC ........................................................ 320/118
See application file for complete search history.

(56) References Cited

U.S. PATENT DOCUMENTS

| | | | | |
|---|---|---|---|---|
| 5,656,915 | A * | 8/1997 | Eaves | 320/118 |
| 6,518,725 | B2 * | 2/2003 | Marten | 320/116 |
| 7,288,919 | B2 * | 10/2007 | Morita | 320/116 |
| 2002/0190692 | A1 * | 12/2002 | Marten | 320/116 |
| 2003/0141843 | A1 * | 7/2003 | Anzawa et al. | 320/118 |
| 2005/0140336 | A1 * | 6/2005 | Anzawa et al. | 320/118 |
| 2006/0022639 | A1 * | 2/2006 | Moore | 320/116 |
| 2006/0103350 | A1 * | 5/2006 | Lai | 320/118 |
| 2007/0285058 | A1 * | 12/2007 | Kuroda | 320/118 |
| 2008/0116850 | A1 * | 5/2008 | Konishi et al. | 320/118 |

* cited by examiner

*Primary Examiner* — Yalkew Fantu
(74) *Attorney, Agent, or Firm* — Rosenberg, Klein & Lee

(57) ABSTRACT

A battery voltage equalizer circuit for equalizing battery voltages among a plurality of battery cells in a serial connection is disclosed. The battery voltage equalizer circuit includes a battery voltage equalizer unit having a plurality of equalizer parts, wherein each equalizer part, coupled to a positive terminal and a negative terminal of a corresponding battery cell, is conducted with an equalization current upon a receipt of an equalization signal, and a battery voltage detector unit, coupled to the positive and negative terminals of the plurality of battery cells, generates the equalization signal so as to conduct the battery voltage equalizer unit as long as a voltage of any one of the battery cells reaches an equalization voltage.

18 Claims, 4 Drawing Sheets

BATTERY VOLTAGE EQUALIZER CIRCUIT AND METHOD FOR USING THE SAME

BACKGROUND OF THE INVENTION

1. Field of the Invention

The present invention relates to a battery voltage equalizer circuit and a method for using the same, and more particularly, to a circuit that is capable of equalizing a battery voltage of each of a plurality of batteries in a serial connection.

2. Description of Related Art

With the development of portable electronic products, demands for rechargeable batteries consequently have been increasing. Rechargeable batteries include conventional nickel-cadmium batteries, developed nickel-metal hydride batteries, lithium-ion batteries, and the latest developed lithium-polymer (Li-Polymer) batteries. The voltages supplied from different types of rechargeable batteries are not the same and the required operating voltage for each of portable electronic products is not the same as well. Therefore, the battery manufacturer connects different numbers of the batteries in a serial manner to form a battery module for providing the required operating voltage for each of the portable electronic products.

Battery modules are needed to be recharged for next usage by chargers while the battery modules are out of power. However, electric power storage of batteries may not be at the same level due to many reasons, such as various manufacturing and environmental conditions. For Example, a 7.4 V Li-Polymer battery module would have two 3.7 V Li-Polymer batteries in a series connection. Initially, while the two Li-Polymer batteries are placed in the market stream the electric power storage thereof may respectively stay at 80% and 70%. Because the rechargeable lithium batteries would be damaged while they are overcharged, the charger for the rechargeable lithium batteries stops charging the batteries as long as any of the rechargeable lithium batteries is fully-charged. Thus, the electric power storage of the two Li-Polymer batteries could be respectively at 100% (maximum of battery capacity) and 90% after charged. When the electrical power storage of either one of the two Li-Polymer batteries decreases to 0% of the maximum battery capacity, the battery module is shut down while the electric power storage of another Li-Polymer batteries remaining at 10% of the maximum battery capacity.

According to the aforementioned example, the equivalent power storage of the battery module is determined by the battery with the lower electric power storage of the battery module. Furthermore, the batteries themselves would be subject to self-discharging with different self-discharging rates. Therefore, the electric power storage of the batteries in the same battery module may be further imbalanced, thereby reducing the actual usable electric energy of the battery module and shortening the life time.

Please refer to FIG. 1, in which a schematic diagram of the digital battery equalization controller in accordance with the product ISL9208 datasheet for Intersil is demonstrated. A digital battery equalization controller 10 comprises a microprocessor-controlled battery equalizer 5 and transistor switches S1~S7. The transistor switches S1~S7 are connected with batteries BAT1~BAT7 through resistors R1~R7 in a parallel connection. The voltages of the battery BAT1~BAT7 are converted to digital signals via analog to digital converters (A/D Converter). Herein, the microprocessor controlled battery equalizer 5 determines the battery with higher battery voltage among the batteries BAT1~BAT7 in response to the digital signals indicative of the battery voltages based on a built-in algorithms and then turns the transistor switch associated with the battery of higher battery voltage on. Thus, charging currents for each of the batteries could be adjusted with respect to the voltage of the batteries, thereby achieving the goal of equalizing the charging of the batteries.

Since the digital battery equalization controller 10 uses the A/D converter to convert the battery voltages to the digital signals in the above example, the overall chip size of the digital battery equalization controller 10 may become larger and thus production cost could be relatively higher. Meanwhile, the digital battery equalization controller 10 is subject to the limitation inherent in the initial circuit design that is only suitable for the battery module having 5 to 7 batteries in total.

Furthermore, the circuit may discharge the batteries with higher voltages until all of the battery voltages are equal, unless some circuit error occurs, e.g., over-temperature, over current, or short circuit. Li-Polymer batteries are considered that are charged or discharged with insignificant battery memory effect regardless of the voltage level thereof. However, discharging capability of the Li-Polymer batteries under different battery voltages would still be negatively affected as shown in FIG. 2, which is a schematic diagram illustrating a relationship between the battery voltage versus the discharge capability when the fully-charged Li-Polymer battery module has been used. Therefore, voltage equalization arbitrarily performed could cause a recession in discharging performance for a Li-Polymer battery module and an electronic product which applied the Li-Polymer battery module could even encounter a crash or corruption due to instantaneous power shortage.

SUMMARY OF THE INVENTION

In view of the drawback of the conventional technology may harm the discharging performance of the battery due to inappropriately charging/discharging battery and higher cost of the digital battery equalization controller, the present invention employs an analog controller having lower cost to equalize the voltages of batteries, which executes the process of equalizing battery voltage when the battery voltage being higher than a predetermined voltage for avoiding damaging the discharging performance of the battery.

In order to achieve the above purpose, the present invention provides a battery voltage equalizer circuit for equalizing battery voltages among a plurality of battery cells in a serial connection. The battery voltage equalizer circuit includes a battery voltage equalizer unit and a battery voltage detector unit. The battery voltage equalizer unit has a plurality of equalizer parts, wherein each equalizer part, coupled to a positive terminal and a negative terminal of a corresponding battery cell, is conducted with an equalization current upon a receipt of an equalization signal. The battery voltage detector unit, coupled to the positive and negative terminals of the plurality of battery cells, generates the equalization signal so as to conduct the battery voltage equalizer unit as long as a voltage of any one of the battery cells reaches an equalization voltage.

The present invention also provides a method for battery voltage equalization, comprising the following steps: detecting a battery voltage of each of a plurality of battery cells that are in a serial connection, conducting an equalizer part in a parallel connection with a corresponding battery cell while the battery voltage of the corresponding battery cell is higher than an equalization voltage, and stopping conducting the equalizer part while the battery voltage of the corresponding battery cells is lower than the equalization voltage.

The present invention also provides a battery voltage equalizer circuit, comprising a battery voltage equalizer unit, a first battery voltage detector unit, and a second battery voltage detector unit. The battery voltage equalizer unit comprises a plurality of equalizer parts, wherein each equalizer part, coupled to a positive and a negative terminal of a corresponding battery cell among the plurality of battery cells that are in a serial connection, is conducted with an equalization current upon a receipt of the equalization signal. The first battery voltage detector unit is coupled to the positive and negative terminals of a first set of the battery cells, generates the equalization signal when any battery cell of the first set of the battery cells reaches an equalization voltage so as to conduct the corresponding equalizer part, and generates a first equalization shutdown signal when all of the first set of the equalizer parts reach the equalization voltage. The second battery voltage detector unit is coupled to the positive and negative terminals of a second set battery cells, generates the equalization signal when any battery cell of the second set of the battery cells reaches the equalization voltage so as to conduct the corresponding equalizer part and stops the corresponding equalizer parts of the second set of the battery cells from being conducted with the equalization current upon a receipt of the first equalization shutdown signal and when all of the second set of the equalizer parts reaches the equalization voltage.

In order to further understand the techniques, means and effects the present invention, the following detailed description and drawings are hereby referred, such that, through which, the purposes, features and aspects of the present invention maybe thoroughly and concretely appreciated; however, the drawings are provided solely for reference and illustration, without any intention to be used for limiting the present invention.

BRIEF DESCRIPTION OF THE DRAWINGS

FIG. 2 illustrates a schematic diagram illustrating a relationship between the battery voltage and the discharge ability when the fully-charged Li-Polymer battery module has been in use for a while;

DETAILED DESCRIPTION OF THE PREFERRED EMBODIMENTS

Figure 1:
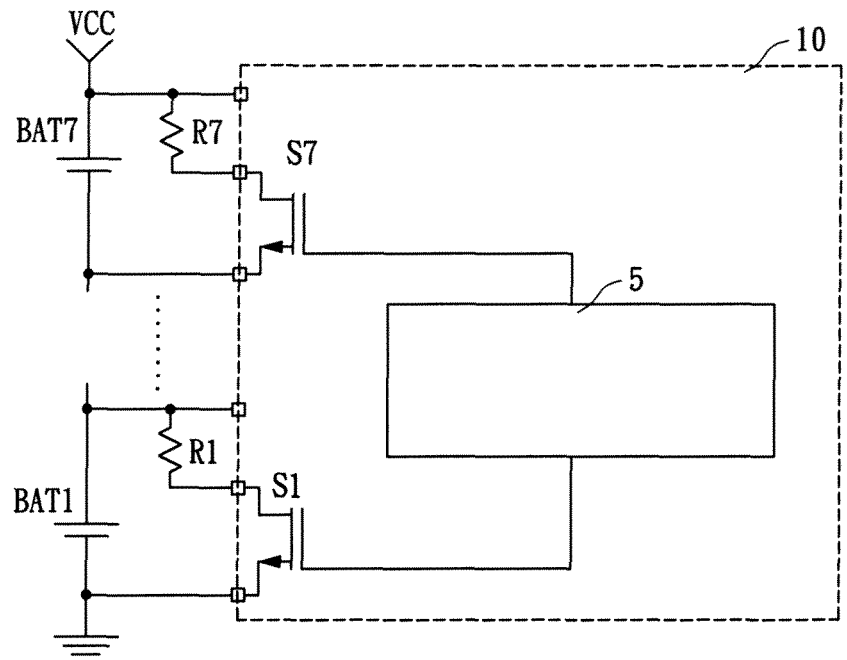
FIG. 1 illustrates a schematic diagram of the digital battery equalization controller in accordance with certain aspects of the prior art.
Figure 2:
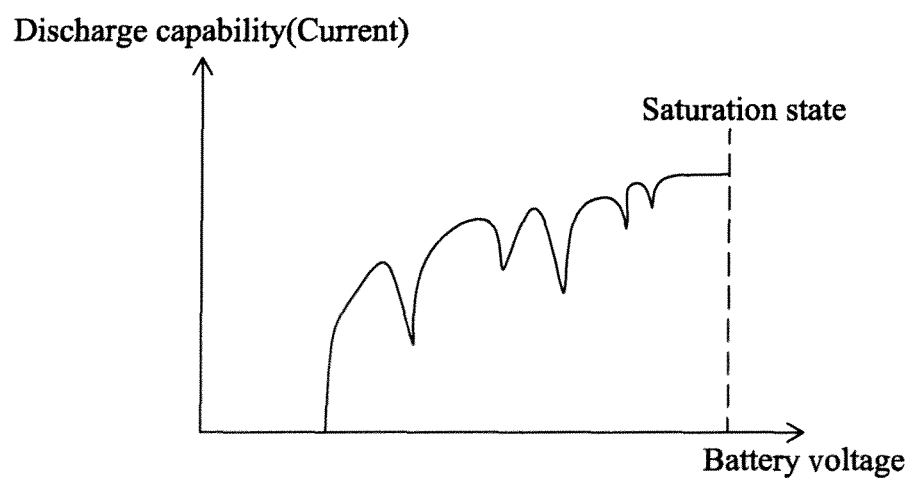

First, referring to FIG. 2, it may virtually cause no impact on the discharge capability when discharging or charging the Li-Polymer battery under a full-charge state in which the electric power storage is at 100% of the maximum battery capacity. The present invention utilizes such characteristic when performing the equalization of the battery voltage for avoiding damaging the discharging performance of the battery.

Figure 3:
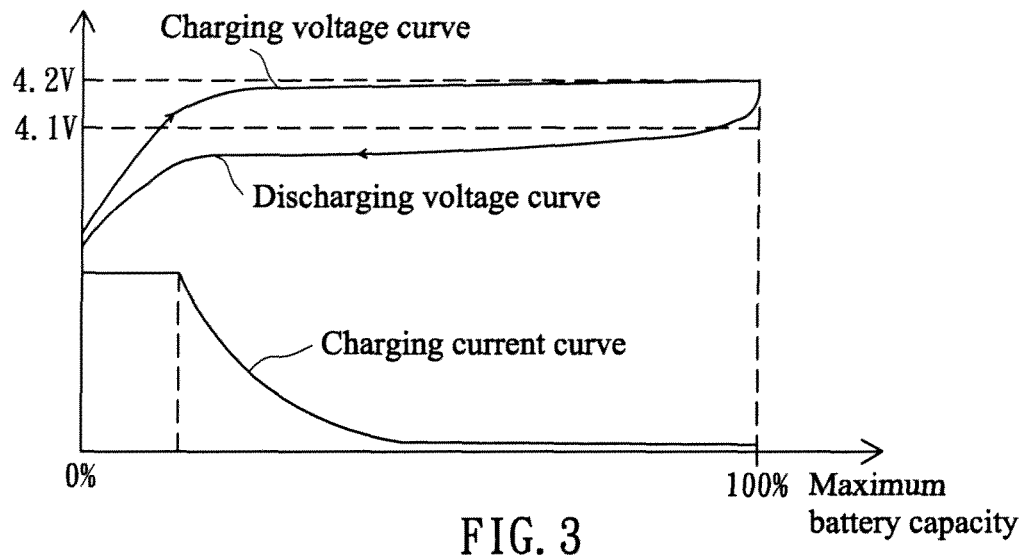
FIG. 3 is a schematic diagram showing a relationship between charging and discharging voltage curves and a charging current curve in accordance with a Li-Polymer battery module.

Please refer to FIG. 3, it shows a schematic diagram showing a relationship between charging and discharging voltage curves and a charging current curve in accordance with a Li-Polymer battery module. As shown in FIG. 3, the battery voltage of the Li-Polymer battery module, charged under constant-current charging mode, rapidly rises during the initial charging period. After that, when the battery voltage approaches rated voltage of 4.2 volts (in this case, taking graphite as the anode material of lithium batteries for example), the charging mode of the Li-Polymer battery module is switched to a constant-voltage charging mode, wherein the electric power storage of the battery increases as the battery voltage raises slowly to the full-charge state. On the other hand, the battery voltage rapidly declines during the initial discharging period and then slow downs. When the electric power storage of the battery is only a small portion left over the course of the discharging, the battery voltage rapidly declines again until the discharging is completed. Therefore, choosing an equalization voltage within the battery voltage region that doesn't manipulate the battery discharging performance in charging and discharging operations to determine weather equalizing the battery voltage should be performed. Except of the aforementioned benefits, it results in the equalizing process merely performs as the battery is close to the full-charge state due to the voltage associated with the region selected is very close to the fully-charged voltage. The equalization voltage is determined based on the characteristics of the battery, so that the battery memory effect is too small to manipulate the battery discharging performance. In one implementation, the chosen battery voltage region is between 90 percents of the maximum battery capacity (or fully-charged voltage) and the maximum battery capacity/fully-charged voltage. The preferred equalization voltage may be above 95 percents of the maximum battery capacity/full-charged voltage, such as, 4.1 volts in the example of FIG. 3.

Therefore, as per the above explanation, the battery voltage equalizer circuit according to the present invention may independently determine when would be an appropriate timing to perform equalizing the battery voltages, without any external activating signals. As a result, the battery voltage equalizer circuit may waste unnecessary electric power consumption of batteries because of equalizing the voltages when the batteries are used (discharged). Consequently, the battery voltage equalizer circuit according to the present invention is adapted for circuit design which activates operations in equalizing voltages of batteries without any external activating signals.

Of course, in the present invention, except of the aforementioned constant-current/constant-voltage charging method, the charging method for the Li-Polymer battery may be other charging methods, wherein the relationship between the voltage and electric power storage thereof is similar to the constant-current/constant-voltage charging method. Charging methods may be classified into a fast charging type of first charging mode and a fine charging type of second charging mode. In order to rapidly charge a battery module at the first charging mode, an average charging current under the first charging mode is higher than that under the second charging mode. To take the constant-voltage/constant-current charging method (CV/CC) as an example, the first charging mode is a constant-voltage mode and the second charging mode is a constant-current mode; to take the constant-current/constant-voltage charging method (CC/CV) as an example, the first charging mode is a constant-current mode and the second charging mode is a constant-voltage mode.

Figure 4:
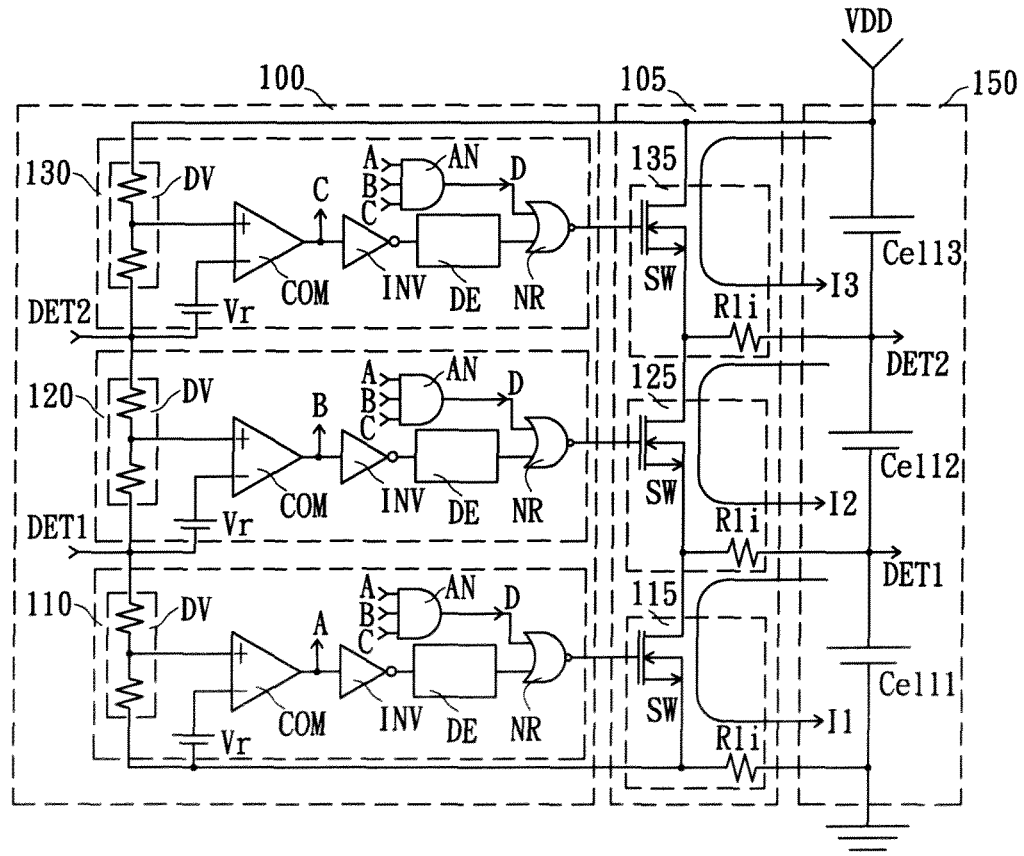
FIG. 4 illustrates a simplified circuit diagram of a battery voltage equalizer circuit along with battery cells in accordance one embodiment of the present invention.

Please refer to FIG. 4, in which a schematic diagram of an embodiment of the battery voltage equalizer circuit in accordance with the present invention is demonstrated. The battery voltage equalizer circuit comprises a battery voltage detector unit 100 and a battery voltage equalizer unit 105 for equalizing a battery module 150. Therein, the battery voltage detector unit 100 includes a plurality of battery voltage detector cells; a battery voltage equalizer unit 105 includes a plurality of equalizer parts; the battery module 150 includes a plurality of battery cells connected in series. In the embodiment, take three battery voltage detector cells 110, 120, 130, three equalizer parts 115, 125, 135, and three battery cells Cell1, Cell2, Cell3 as an example for illustration.

The three battery voltage detector cells 110, 120, 130 of the battery voltage detector unit are coupled to the positive and negative terminals of the three battery cells Cell1, Cell2, Cell3, respectively, so as to detect the battery voltage of the three battery cells Cell1, Cell2, Cell3. Each battery voltage detector cell comprises a potential divider DV, a comparator COM, a bias device Vr, an inverter INV, a delayer DE, an equalization shutdown circuit AN, and a NOR gate NR. The potential divider DV detects the voltage of the corresponding battery cell and accordingly generates a potential divider signal to a non-reverse input terminal of the comparator COM. The bias device Vr provides a bias voltage to a reverse input terminal of the comparator COM based on the corresponding battery cell voltage at the negative terminal. When the potential level of the non-reverse input terminal is higher than that of the reverse input terminal, it represents that the voltage of the corresponding battery cell is higher than the equalization voltage, and meanwhile, the comparator COM outputs the high level equalization signal to the inverter INV. The inverter INV inverts the high level equalization signal and outputs it to the delayer DE. The delayer DE delays the signal for a specific time and then transfers it to the NOR gate NR. The equalization shutdown circuit AN may be a AND gate, in which the AND gate receives equalization signals with high voltage level A, B, C generated from the comparators COM of the battery voltage detector cells 110, 120, 130 and accordingly inputs an equalization shutdown signal D to the NOR gate NR. There may be a short temporary period while the three battery cells reach the equalization voltage simultaneously before the equalization shutdown signal D of the equalization shutdown circuit AN ceases to process in equalizing the voltages completely. The three NOR gates NR simultaneously conducts three switches SW associated with the three equalizer parts 115 125 135 during the short temporary period, and it results unnecessary waste of electric power and damaging in elements due to over-heated. Hence, the present invention uses the delayer DE for preventing the aforementioned unexpected situations occurred.

The three equalizer parts 115, 125 135 are coupled to the positive and negative terminals of the three battery cells Cell1, Cell2, Cell3 respectively, and each of them includes the switch SW and a current limiter Rli. In this embodiment, the switch SW is an N-type metal oxide semiconductor transistor and the current limiter is a resistor. In other embodiments, the switch SW is a P-type metal oxide semiconductor transistor, while the NOR gate NR of the battery voltage detector cells 110, 120 130 have to be replaced by an OR gate.

Each of the equalization signals A, B, C controls its corresponding switch SW so as to conduct an equalization current passed through. When the battery module 150 is in charge, the external charging circuit (not shown in the figure) may provide a charging current to the battery module to charge the battery module. A better setup of the equalization current is close to the charging current, so that the battery cell which reaches the equalization voltage may maintain at this voltage level until other battery cell(s) reaches the equalization voltage. Subsequently, when the three battery cells Cell1, Cll2, Cell3 reach the equalization voltage and after the equalization signals A, B, C are at high level so as to enable the equalization shutdown circuit AN to output the equalization shutdown signal D. The NOR gate NR then outputs low-level signals, so that the three switches SW is cut off to stop conducting. After that, the battery voltage of the three battery cells Cell1, Cell2, Cell3 continue to be charged until fully-charged.

Of course, no matter whether the equalization current is larger than or smaller than the charging current, it doesn't affect the functionality of equalizing the battery voltage in accordance with the battery voltage equalizer circuit according to the present invention. When the equalization current is larger than the charging current, the switch SW may switch between "on" and "off" so as to maintain the battery voltage to be around the equalization voltage through the comparator COM associated with the battery voltage detector cells 110, 120, 130. As all of battery voltages reach to the equalization voltage, the equalization current is cut off by the switches SW, and the battery voltages of the battery cells Cell1, Cell2, Cell3 continue to be charged until fully charged. As the equalization current is smaller than the charging current, the charging current of the battery cell which has reached the equalization voltage earlier is smaller than those which have not yet reached the equalization voltage, such that the voltage difference between the battery cells is minimized.

Figure 5A:
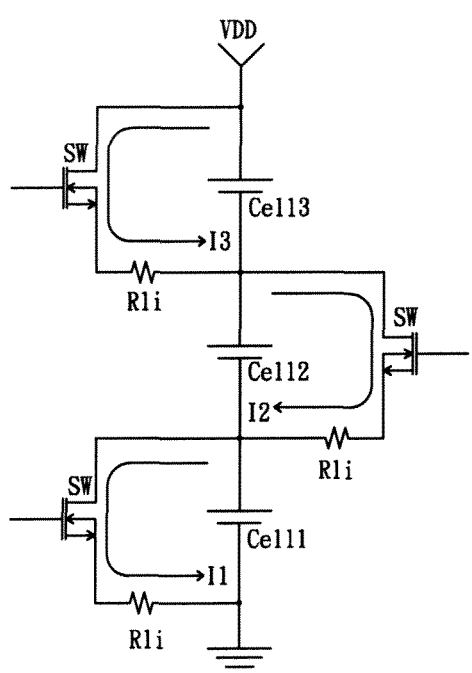
FIG. 5A illustrates a simplified circuit diagram showing a connection configuration of switches and battery cells according to one embodiment of the present invention.

The battery voltage detector unit 100 and the switch SW of the battery voltage equalizer unit 105 may be integrated into the same package body, or even into the same chip, while the current limiter Rli is built into the chip. In another implementation, the current limiter Rli is externally connected to the package or the chip having the battery voltage detector unit 100 and the switch SW therein, so that an appropriate resistance of the current limiter Rli may be determined according to practical applications. However, please refer to FIG. 4, the equalization current I1 and the equalization current I3 are almost equal, but the equalization current I2 passing through two current limiters Rli at the same time becomes almost a half of the value of the equalization current I1 or the equalization current I3. If the switches SW associated with the battery cells Cell2, Cell3 are conducted at the same time, the equalization current doubles up due to passing through only one current limiter Rli. To avoid the inconsistency of equalization current, the connecting configuration of the current limiters can be changed according to the FIG. 5A of a simplified circuit diagram showing a connection configuration of switches and battery cells according to one embodiment of the present invention. Thus, the equalization current I1, I2, I3 will be almost equal to each other, and the simultaneous conducting of the two switches SW would have no impact on the equalization current.

Figure 5B:
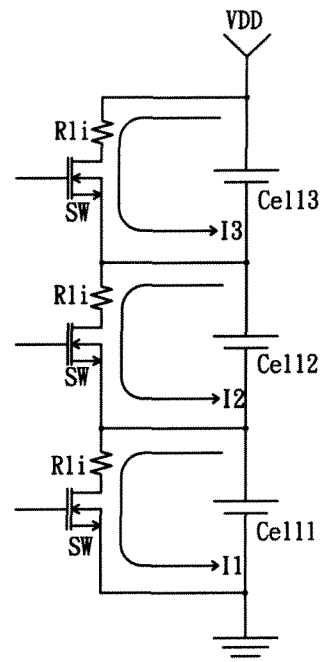
FIG. 5B illustrates a simplified circuit diagram showing a connection configuration of switches and battery cells according to one embodiment of the present invention.

FIG. 5B illustrates a simplified circuit diagram of another connection configuration of switches and battery cells according to one embodiment of the present invention. In FIG. 5B, the three switches SW and the three current limiters Rli are connected in series and then connect with the battery module 150 in parallel. Thus, no matter whether only one switch SW is conducted or multiple switches are conducted simultaneously, the amount of the equalization current generated is consistent. Moreover, even if the three switches are conducted simultaneously, the current limitation may serve so as to minimize the risk of damaging the switches SW. It is worth noting that having all of the switches SW and at least one current limiter Rli in a serial connection may limit the current passing the switches SW for shielding the switches SW from potential damages. Therefore, the battery voltage detector unit 100 may omit the delayer DE to reduce the production cost and even omit the equalization shutdown circuit AN.

A method for battery voltage equalization according to the present invention is disclosed. The method comprises steps of: individually detecting each battery voltage of a plurality of battery cells connected in series; conducting a equalizer part connected in parallel with a corresponding battery cell among the plurality of battery cells while the voltage of the corresponding battery cell is higher than an equalization voltage; and cutting off the equalizer part while the voltage of the corresponding battery cell is lower than the equalization voltage.

As per the above illustrations, whether battery module 150 is not in charging mode, such as: the mode in use (for driving a load) or in non-use, the curve of the battery voltage thereof may be as the discharging voltage curve shown in the FIG. 3. Meanwhile, even though the battery voltage detector unit 100 doesn't cease to function, the battery voltage goes down at most to 4.1V, which is the equalization voltage, due to the switch SW being cut off. At the same time, the battery capacity still maintain at about 100%, such that the loss issue of electric power storage caused by equalizing the battery voltage may be prevented.

Figure 6:
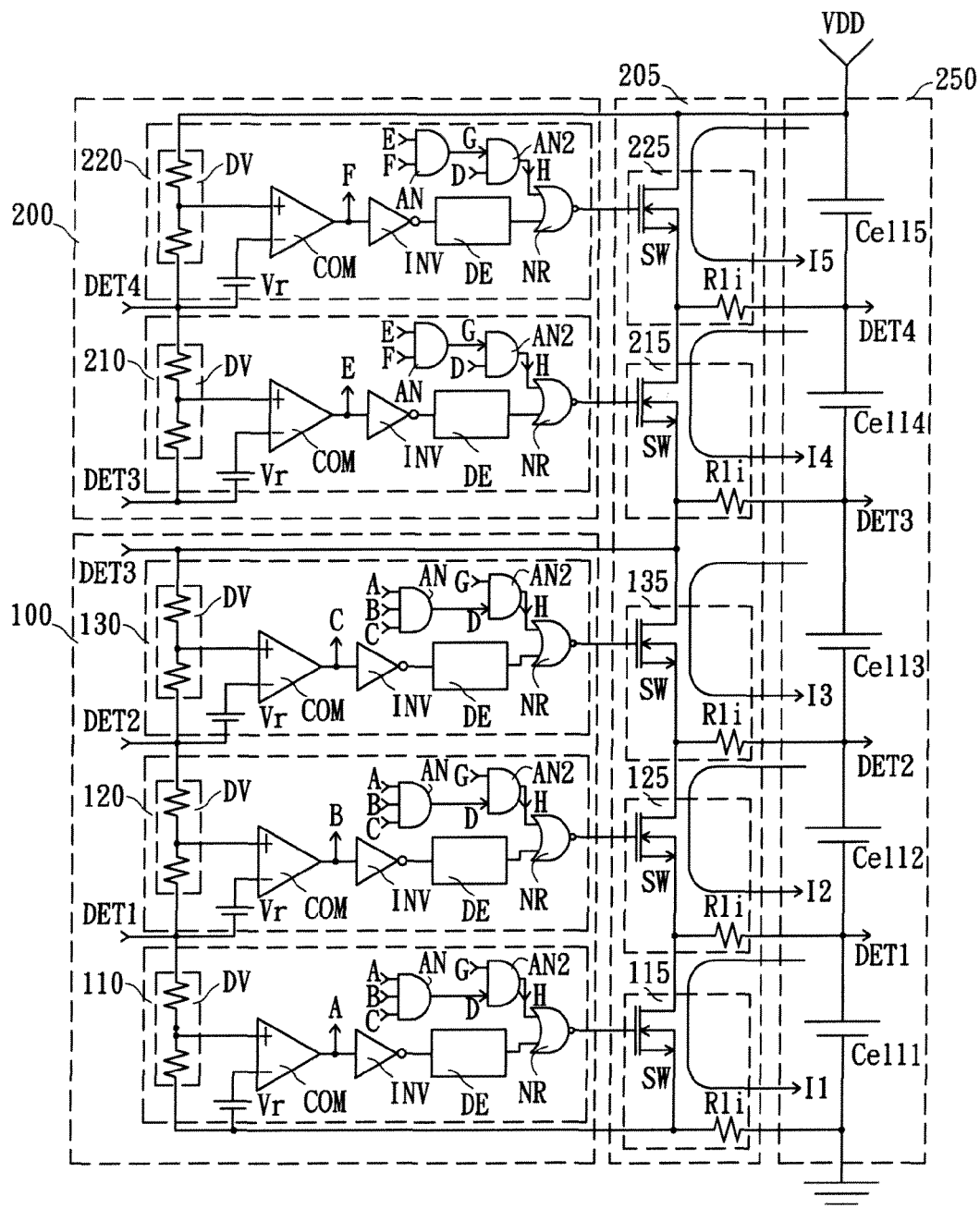
FIG. 6 illustrates a simplified circuit diagram of a battery voltage equalizer circuit along with battery cells in accordance with one embodiment of the present invention.

Subsequently, please refer to FIG. 6, in which a schematic diagram of another embodiment of the battery voltage equalizer circuit in accordance with the present technique is demonstrated. As the number of the battery cells included in a battery module 250 exceeds the number of the battery cells could be supported by a single battery voltage detector unit 100, it may utilize two or more than two of the battery voltage detector units 100, 200 to equalize the battery voltage of the battery module 250. In the embodiment, the battery module 250 includes the five battery cells Cell1, Cell2, Cell3, Cell4, Cell5, wherein the battery voltage detector unit 100 may equalize the three battery cells Cell1, Cell2, Cell3, and the battery voltage detector unit 200 may equalize the two battery cells Cell4, Cell5. The battery voltage detector unit 100 includes the battery voltage detector cells 110, 120, 130, the battery voltage detector unit 200 includes the battery voltage detector cells 210, 220. In one implementation, the battery voltage detector cells in FIG. 6 are the same as the battery voltage detector cells show in FIG. 4.

The battery voltage detector cells 110, 120, 130, 210, 220 generate the equalization signals A, B, C, E, F respectively, as voltages of the corresponding battery cell reach the equalization voltage. While the equalization shutdown circuit AN of the battery voltage detector unit 100 receives the "high" equalization signals A, B, C, it outputs a first equalization shutdown signal D. While the equalization shutdown circuit AN of the battery voltage detector unit 200 receives the "high" equalization signals E, F, it outputs a second equalization shutdown signal G. AND gates AN2 receive the first equalization shutdown signal D and the second equalization shutdown signal G so as to output signals H. As all of the battery cells of the battery module 250 reach the equalization voltage, the NOR gates NR of the battery voltage detector unit 100 receive the output signals of the delayers DE and the output signals H of the AND gates AN2, cut off the switches SW associated with the corresponding equalizer parts 115, 125, 135 of the battery voltage equalizer unit 205, thereby ceasing the equalization currents I1, I2, I3. Similarly, as all of the battery cells of the battery module 250 reach the equalization voltage, the NOR gates NR of the battery voltage detector unit 200 receive the output signals of the delayers DE and the output signals H of the AND gates AN2, cut off the switches SW associated with the corresponding equalizer parts 215, 225 of the battery voltage equalizer unit 205, thereby ceasing the equalization currents I4, I5.

In the aspects of the aforementioned embodiments, the technical characteristics of the present invention are to equalize the battery voltages associated with more battery cells of the battery module by applying multiple battery voltage detector units together, and ceases the conducting equalization current as all the battery cells reach the equalization voltage to prevent from resulting in unnecessary waste of electric power and damaging in elements due to over-heated.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. A battery voltage equalizer circuit for equalizing battery voltages among a plurality of battery cells in a serial connection, comprising:
a battery voltage equalizer unit, which comprises a plurality of equalizer parts, wherein each equalizer part, coupled to a positive terminal and a negative terminal of a corresponding battery cell among the plurality of battery cells, is conducted with an equalization current upon a receipt of an equalization signal;
a battery voltage detector unit, coupled to the positive and negative terminals of the plurality of battery cells, generating the equalization signal so as to conduct the battery voltage equalizer unit as long as a voltage of any one of the battery cells reaches an equalization voltage; and
an equalization shutdown circuit avoids the equalizer parts from being conducted with the equalization current when all of the battery cells reach the equalization voltage.

2. The battery voltage equalizer circuit according to claim 1, wherein the equalization voltage is higher than 90% of a fully-charged voltage for the battery cell.

3. The battery voltage equalizer circuit according to claim 1, wherein the equalization voltage is determined based on characteristics of the battery cell with an insignificant battery memory effect from the equalization voltage to the fully-charged voltage of the battery cell.

4. The battery voltage equalizer circuit according to claim 1, wherein each of the equalizer parts comprises a switch and a current limiter, and the switch is conducted upon the receipt of the equalization signal.

5. The battery voltage equalizer circuit according to claim 4, wherein the battery voltage detector unit further comprises a delayer for delaying a predetermined period of time for the equalization signal to be generated.

6. The battery voltage equalizer circuit according to claim 3, wherein each of the equalizer parts comprises a switch and a current limiter, and the switch is conducted upon the receipt of the equalization signal.

7. The battery voltage equalizer circuit according to claim 6, wherein the switches of the plurality of equalizer parts are in a serial connection with at least one of the current limiters.

8. A method for battery voltage equalization, comprising:
detecting a battery voltage of each of a plurality of battery cells that are in a serial connection;

determining whether the battery voltages for all of the battery cells are higher than an equalization voltage;

when the battery voltages for all of the battery cells are higher than an equalization voltage, stopping conducting each equalizer part used for equalizing voltage in a parallel connection with each battery cell; and when the battery voltage for at least one of the battery cell is lower than the equalization voltage, conducting the equalizer part in a parallel connection with the corresponding battery cell in which the battery voltage of the corresponding battery cell is higher than the equalization voltage.

9. The method for battery voltage equalization according to claim 8, wherein the equalization voltage is higher than 90% of a fully-charged voltage of the battery cell.

10. The method for battery voltage equalization according to claim 8, wherein the equalization voltage is determined based on the characteristics of the battery cell with an insignificant battery memory effect from the equalization voltage to the fully-charged voltage of the battery cell.

11. The method for battery voltage equalization according to claim 10, wherein the method further includes:

providing a charging current to the plurality of battery cells.

12. The method for battery voltage equalization according to claim 11, wherein each of the equalizer parts comprises a switch and a current limiter, and the switches are in a serial connection with at least one of the current limiters.

13. The method for battery voltage equalization according to claim 8, wherein a conducting current flowing through the equalizer part when the equalizer part is conducted is larger or equal to the charging current.

14. A battery voltage equalizer circuit, comprising:

a battery voltage equalizer unit, which comprises a plurality of equalizer parts, wherein each equalizer part, coupled to a positive and a negative terminal of a corresponding battery cell among the plurality of battery cells that are in a serial connection, is conducted with an equalization current upon a receipt of the equalization signal;

a first battery voltage detector unit, coupled to the positive and negative terminals of a first set of the battery cells, generating the equalization signal when any battery cell of the first set of the battery cells reaches an equalization voltage so as to conduct the corresponding equalizer part, and generating a first equalization shutdown signal when all of the first set of the equalizer parts reach the equalization voltage; and a second battery voltage detector unit, coupled to the positive and negative terminals of a second set of the battery cells of the battery cells, generating the equalization signal when any battery cell of the second set of the battery cells reaches the equalization voltage so as to conduct the corresponding equalizer part and stops the corresponding equalizer parts of the second set of the battery cells from being conducted with the equalization current upon a receipt of the first equalization shutdown signal and when all of the second set of the equalizer parts reaches the equalization voltage.

15. The battery voltage equalizer circuit according to claim 14, wherein the second battery voltage detector unit generates a second equalization shutdown signal when all of the second set of the equalizer parts reach the equalization voltage, and the first battery voltage detector unit stops the corresponding equalizer parts of the first set of the battery cells from being conducted with the equalization current upon a receipt of the second equalization shutdown signal and when all of the first set of the equalizer parts reaches the equalization voltage.

16. The battery voltage equalizer circuit according to claim 15, wherein each of the equalizer parts comprises a switch and a current limiter, and the switch is conducted upon the receipt of the equalization signal.

17. The battery voltage equalizer circuit according to claim 16, wherein the battery voltage detector unit further comprises a delayer for delaying a predetermined period of time for the equalization signal to be generated.

18. The battery voltage equalizer circuit according to claim 16, wherein the switches of the equalization cells are in a serial connection with at least one of the current limiters.

* * * * *